(12) United States Patent
Yoshioka et al.

(10) Patent No.: US 8,128,055 B2
(45) Date of Patent: Mar. 6, 2012

(54) MOLD FOR PRODUCING A SILICA CRUCIBLE

(75) Inventors: Takuma Yoshioka, Akita (JP); Masaki Morikawa, Akita (JP)

(73) Assignee: Japan Super Quartz Corporation, Akita-shi (JP)

( * ) Notice: Subject to any disclaimer, the term of this patent is extended or adjusted under 35 U.S.C. 154(b) by 81 days.

(21) Appl. No.: 12/604,039

(22) Filed: Oct. 22, 2009

(65) Prior Publication Data

US 2010/0112115 A1    May 6, 2010

(30) Foreign Application Priority Data

Oct. 31, 2008    (JP) .................................. 2008-281958

(51) Int. Cl.
*C03B 13/06*    (2006.01)
(52) U.S. Cl. ......... 249/117; 249/135; 249/160; 65/17.3; 65/144; 65/302
(58) Field of Classification Search .......... 249/134–135, 249/114.1–117, 98, 137, 160; 425/110, 117, 425/127, 467–470; 65/17.3, 30.1, 33.5, 33.6, 65/36, 134.7, 144, 302
See application file for complete search history.

(56) References Cited

U.S. PATENT DOCUMENTS

| | | | | |
|---|---|---|---|---|
| 4,956,208 | A * | 9/1990 | Uchikawa et al. | 428/34.6 |
| 6,548,131 | B1 * | 4/2003 | Englisch et al. | 428/34.4 |
| 6,886,364 | B2 * | 5/2005 | Ohama et al. | 65/17.3 |
| 2002/0014574 | A1 * | 2/2002 | Wakita et al. | 249/204 |
| 2003/0113449 | A1 * | 6/2003 | Tsuji et al. | 427/231 |
| 2004/0072007 | A1 * | 4/2004 | Kemmochi et al. | 428/544 |
| 2004/0115440 | A1 * | 6/2004 | Werdecker et al. | 428/426 |
| 2005/0000404 | A1 * | 1/2005 | Kishi et al. | 117/13 |
| 2008/0141929 | A1 * | 6/2008 | Kemmochi et al. | 117/208 |
| 2009/0173276 | A1 * | 7/2009 | Satou | 117/208 |
| 2010/0162767 | A1 * | 7/2010 | Shimazu | 65/348 |
| 2010/0176530 | A1 * | 7/2010 | Yoshioka et al. | 264/114 |
| 2010/0178374 | A1 * | 7/2010 | Yoshioka et al. | 425/404 |
| 2010/0178375 | A1 * | 7/2010 | Yoshioka et al. | 425/425 |

FOREIGN PATENT DOCUMENTS

| | | | |
|---|---|---|---|
| EP | 1024118 A1 * | 1/2000 | |
| JP | 11292694 A * | 10/1999 | |
| JP | 2001114590 A * | 4/2001 | |
| JP | 2002003228 A * | 1/2002 | |
| JP | 2004107163 A * | 4/2004 | |
| JP | 200696616 A * | 4/2006 | |
| KR | 10-2008-0056674 A | 6/2008 | |

OTHER PUBLICATIONS

Korean Office Action mailed Sep. 28, 2011, issued in corresponding Korean Application No. 10-2009-0102203, filed Oct. 27, 2009, with machine English translation provided by foreign associate, 8 pages.

* cited by examiner

*Primary Examiner* — Dimple Bodawala
(74) *Attorney, Agent, or Firm* — Christensen O'Connor Johnson Kindness PLLC

(57) ABSTRACT

A mold for the production of a silica crucible by heat-fusing silica or quartz powder attached onto an inner wall of a rotating mold, wherein a ring-shaped heat insulating barrier material having a specified inner diameter is disposed on an inner peripheral wall of an upper opening portion of the mold corresponding to an upper region of the silica crucible.

8 Claims, 2 Drawing Sheets

MOLD FOR PRODUCING A SILICA CRUCIBLE

BACKGROUND

1. Field of the Invention

This invention relates to a mold for the production of a silica crucible. Particularly, the invention is directed to advantageously reduce raw material cost by devising an upper form of an inner wall in an opening portion of the mold.

2. Description of the Related Art

Recently, the use of a silicon wafer as a substrate for semiconductor devices has increased rapidly. Such a silicon wafer is usually produced by forming a silicon single crystal ingot and then slicing it.

Such a silicon single crystal ingot is generally produced, for example, by a pulling method such as the CZ method, or the like. Also, a silica crucible is used for pulling the silicon single crystal.

A typical method of producing a silica crucible is known as the rotating mold method. The rotating mold method is a method wherein silica or quartz powder is attached to an inner wall of a rotating mold, that is, a bottom surface and a side surface of the mold and then fused by heating (e.g., by arc heating) to produce a silica crucible.

Recently, the silicon single crystal ingot is desired to have a larger diameter in association with the rapid increase in the demand for silicon wafers.

When such a large-diameter silicon single crystal ingot is produced by the pulling method, the silica crucible to be used is also required to have a larger diameter.

In order to produce the silicon single crystal ingot by the pulling method, it is usually required to use a silica crucible having a diameter corresponding to about three times the diameter of the ingot.

When the silica crucible is produced by the above-mentioned rotating mold method, a portion having a small outer diameter and a thin thickness (hereinafter referred to as a small-diameter thinned portion) occurs in an upper part of the silica crucible, and hence it is required to remove the small-diameter thinned portion by cutting.

When the silica crucible is heated to a high temperature in a step for filling and melting Si in the silica crucible to pull a Si single crystal, the viscosity of silica is reduced as the temperature rises and hence the silica crucible is easily deformed. Especially when the upper part of the silica crucible is the small-diameter thinned portion, it is easily deformed.

A cause of forming such a small-diameter thinned portion is that heat easily escapes at the opening portion of the mold and the silica or quartz powder is not completely melted by arc heating, and hence the outer diameter at the upper part of the silica crucible becomes small and the thickness thereof becomes thin. The formation of such a small-diameter thinned portion is unavoidable in the production process.

Therefore, when the silica crucible is produced by the rotating mold method, by anticipating the formation of the small-diameter thinned portion is produced a silica crucible having a crucible height higher by the small-diameter thinned portion than a height of a product specification and then the small-diameter thinned portion is removed by cutting to obtain a product.

Also, silica crucibles having different heights may be produced in the same mold. Although there is no problem in the production of a silica crucible having a higher height, a portion to be removed by cutting becomes large in the production of a silica crucible having a low height. In order to solve this problem, a mold for exclusive use in a product having a low height may be provided, but when the number of silica crucibles produced is small, or the like, there is a disadvantage that the production cost of a new mold and related costs become significant.

As described above, when the silica crucible is produced by the rotating mold method, the formation of the small-diameter thinned portion is unavoidable, so that a silica crucible having a crucible height higher by the small-diameter thinned portion than a height of a product specification is produced and then the small-diameter thinned portion is removed by cutting to obtain a product.

However, the silica crucible is recently required to have a large diameter with the increase of the diameter of the silicon single crystal ingot as described above. When the diameter of the crucible is made larger, a portion obliged to be removed by cutting is also increased due to the small-diameter thinning, which causes a serious problem in terms of the material cost, and hence the production cost.

For example, if it is intended to produce a crucible having an outer diameter of 18 inches and a thickness of 8 mm, about 0.3 kg of silica or quartz powder as an absolute amount is used extra per a cutting-removing height of 10 mm.

On the other hand, if it is intended to produce a large-size silica crucible having an outer diameter of 32 inches, the thickness increases to approximately 15 mm, and hence about 1.0 kg of silica or quartz powder as an absolute amount is used extra per cutting-removing height of 10 mm.

In the production of a large-size silica crucible, therefore, the wasted amount of silica or quartz powder used per the cutting-removing height in the production of one crucible increases to three to four times that of producing a small-size silica crucible.

SUMMARY

The invention is developed in the light of the above situation and is to provide a mold for the production of a silica crucible capable of reducing a portion obliged to be removed by cutting due to the small-diameter thinning in the upper part of the silica crucible to effectively reduce the material cost.

That is, the summary and construction of the invention are as follows:

1. A mold for producing a silica crucible by heat-fusing silica or quartz powder at a state attached onto an inner wall of a rotating mold, characterized in that a ring-shaped heat insulating barrier material having an inner diameter smaller than that of the mold and larger than that of the silica crucible is disposed on an inner peripheral wall of an upper opening portion of the mold corresponding to an upper region of the silica crucible.

2. A mold for producing a silica crucible according to item 1, wherein the barrier material is quartz, carbon, silicon carbide or silicon nitride.

3. A mold for producing a silica crucible according to item 1, wherein a protruding thickness $t_1$ of an inner surface of the ring-shaped barrier material from the inner peripheral wall of the mold represented by the following equation:

$$t_1 = \text{(mold inner diameter} - \text{barrier material inner diameter)}/2 \text{ is 20 to 80\% of an attached thickness } t_2 \text{ of silica or quartz powder.}$$

4. A mold for producing a silica crucible according to item 1, wherein the inner surface of the barrier material has a surface roughness of 6.3 to 25 μm as an arithmetic mean roughness Ra.

According to the invention, it is possible to reduce a portion to be removed by cutting due to the small-diameter thinning as compared with the conventional technique, and as a result, the material cost as well as the production cost can be reduced.

DESCRIPTION OF THE DRAWINGS

The invention will be described with reference to the accompanying drawings, wherein.

DETAILED DESCRIPTION

Figure 1:
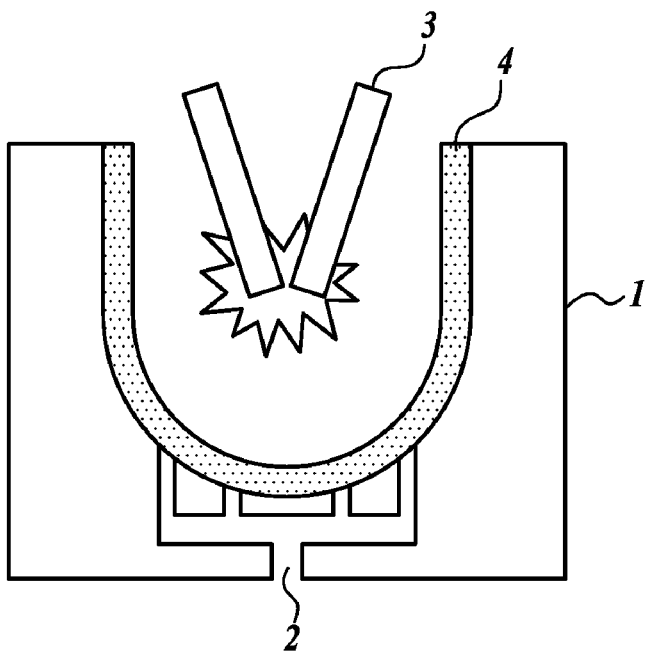
FIG. 1 is a cross-sectional view illustrating a production instruction of a silica crucible by a rotating mold method.

In FIG. 1 is schematically shown a general production method of a silica crucible by a rotating mold method. In the figure, numeral 1 is a mold, numeral 2 a vent line, numeral 3 an arc electrode, and numeral 4 silica or quartz powder attached onto an inner wall of the mold 1.

In the rotating mold method, the silica or quartz powder 4 attached onto the inner wall of the rotating mold 1 can be vitrified by heat-fusing through arc heating to shape into a crucible shape.

Figure 2:
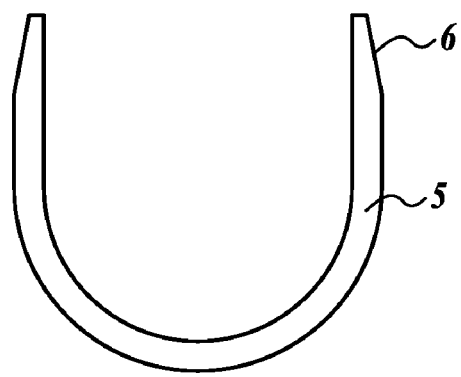
FIG. 2. is a cross-sectional view of a silica crucible produced using a general mold, as known in the prior art.

In FIG. 2 is shown a cross-sectional shape of a vitreous silica crucible 5 produced by using a conventional general mold, as is known in the prior art.

As shown in FIG. 2, the upper portion of the vitreous silica crucible 5 becomes smaller in the outer diameter and thinner in the thickness to generate a small-diameter thinned portion 6.

Figure 3:
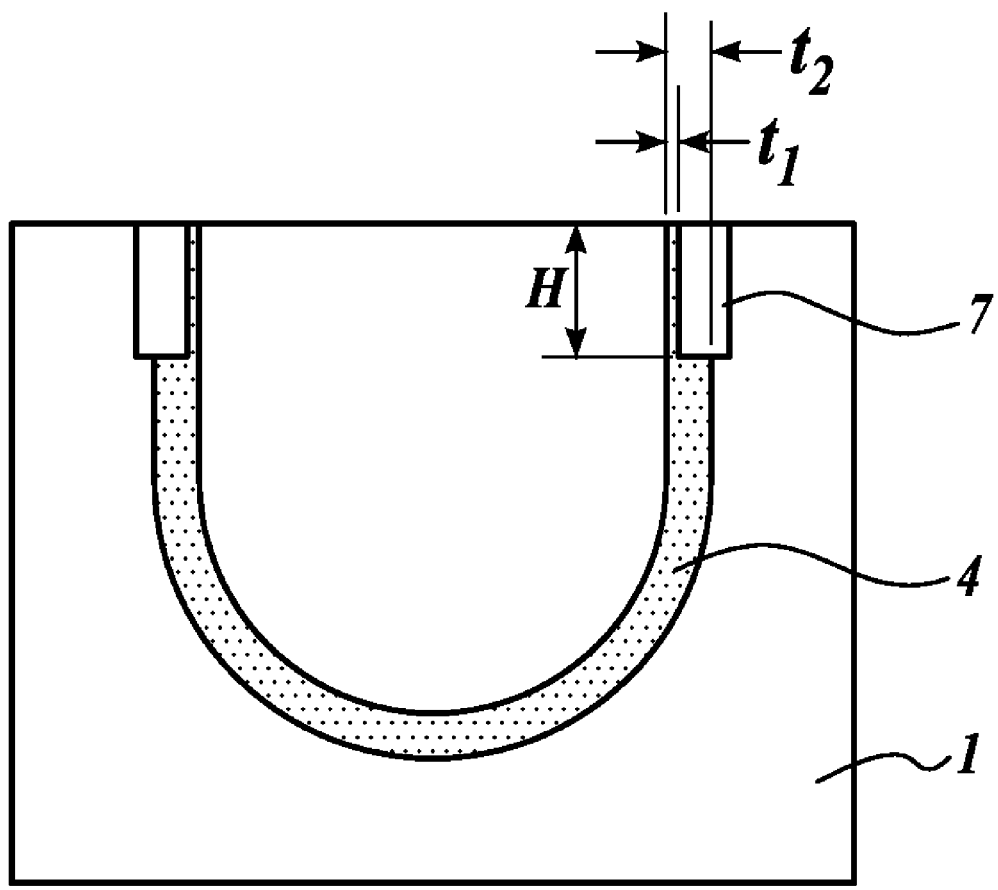
FIG. 3. is a cross-sectional view of a mold provided with a ring-shaped barrier material in an upper opening portion of a mold according to the invention

The invention solves the above problem by using a mold as shown in FIG. 3.

The invention is based on a technological idea that if an upper portion of a silica crucible becomes unavoidably smaller in the outer diameter and thinner in the thickness in the production of the crucible, a barrier material is used in such a portion to preliminarily render the mold shape into a shape corresponding to the shape of the upper portion of the crucible, whereby the amount of silica or quartz powder wastefully used can be reduced.

In FIG. 3, the main structural parts are the same as in the conventional mold shown in FIG. 1 and are represented by the same numerals. Numeral 7 is a barrier material disposed in the upper opening portion of the mold.

As shown in FIG. 3, the barrier material is ring-shaped with an inner diameter being smaller than that of the mold and larger than that of the silica crucible. An inner surface of the barrier material 7 protrudes from an inner surface of the mold 1 toward a central axis of the mold 1 to reduce or thin an upper portion of the silica crucible. The protruding thickness $t_1$ of the barrier material 7 from the inner peripheral wall of the opening portion is preferable to be 20 to 80% of the attached thickness $t_2$ of silica or quartz powder. When the ratio of the protruding thickness $t_1$ to the attached thickness $t_2$ is less than 20%, the effect of reducing the silica or quartz powder used, and hence the cost-saving effect, is small, while when it exceeds 80%, there is a risk that the barrier material will be consumed by oxidation.

Also, the height H of the barrier material 7 may be equal to the height of the small-diameter thinned portion. For example, when a crucible having an outer diameter of 32 inches and a thickness of 15 mm is produced, the height of the small-diameter thinned portion is about 30 to 100 mm.

Further, in the invention, the inner surface of the barrier material is preferable to have a surface roughness of 6.3 to 25 μm as an arithmetic mean roughness (Ra). When the roughness of the inner surface in the barrier material is less than 6.3 μm as Ra, silica or quartz powder easily moves at the time of attachment or heat-fusion of the silica or quartz powder and hence the deterioration of the crucible accuracy is caused, while when it exceeds 25 μm, grains fall off from the surface of the barrier material and become impurities of the silica crucible.

In the invention, the barrier material is preferable to be excellent in heat insulating properties and heat resistance and small in thermal expansion and variation with time, which is exemplified as follows.

(1) quartz (thermal conductivity: 5 to 10 W/mK, coefficient of thermal expansion: about $5.6 \times 10^{-7}/°$ C.)

(2) carbon (thermal conductivity: about 140 W/mK, coefficient of thermal expansion: about $5 \times 10^{-6}/°$ C.)

(3) silicon carbide (thermal conductivity: 100 to 350 W/mK, coefficient of thermal expansion: about $6.6 \times 10^{-6}/°$ C.)

(4) silicon nitride (thermal conductivity: 200 W/mK, coefficient of thermal expansion: $3.5 \times 10^{-6}/°$ C.)

Example 1

When a silica crucible is produced with a mold having the conventional structure shown in FIG. 1, the weight of silica or quartz powder used for a cutting portion at the upper part of the crucible is represented by the following equation:

Weight of silica or quartz powder used={(inner radius of mold)$^2$−(inner radius of mold−attached thickness)$^2$}×3.14×cutting height×bulk specific gravity of silica or quartz powder (B value)

On the other hand, when a silica crucible is produced with a mold having a structure according to the invention shown in FIG. 3, the amount of silica or quartz powder used can be reduced by an amount represented by the following equation:

Amount of silica or quartz powder reduced={(inner radius of barrier material+protruding thickness)$^2$−(inner radius of barrier material)$^2$}×3.14× height of barrier material×bulk specific gravity of silica or quartz powder (A value)

Therefore, according to the invention, the amount of silica or quartz powder used can be reduced as compared with the conventional case by an amount shown by (A/B)×100 (%).

When a silica crucible having an outer diameter of 810 mm and a thickness of 15 mm is produced with the mold having a structure according to the invention shown in FIG. 3, B value=14.5 kg and A value=6.2 kg, and thus the amount of silica or quartz powder used can be reduced by 43% as compared with the conventional case (provided that a cutting height of an upper part of a crucible is 120 mm; an inner radius of a barrier material is 780 mm; a height H of a barrier material is 100 mm; a protruding thickness $t_1$ of a barrier material is 20 mm; and an attached thickness $t_2$ of silica or quartz powder is 40 mm).

What is claimed is:

1. A mold for producing a silica crucible by heat-fusing silica or quartz powder at a state attached onto an inner wall of a rotating mold, characterized in that a ring-shaped heat insulating barrier material having an inner diameter smaller than that of the mold and larger than that of the silica crucible is disposed on an inner peripheral wall of an upper opening portion of the mold corresponding to an upper region of the silica crucible. wherein an inner surface of the barrier material protrudes from an inner surface of the mold toward a central axis of the mold to reduce or thin an upper portion of the silica crucible.

2. A mold for producing a silica crucible according to claim 1, wherein the barrier material is quartz, carbon, silicon carbide or silicon nitride.

3. A mold for producing a silica crucible according to claim 1, wherein a protruding thickness $t_1$ of an inner surface of the ring-shaped barrier material from the inner peripheral wall of the mold represented by the following equation:

$$t_1 = \text{(mold inner diameter--barrier material inner diameter)}/2 \text{ is 20 to 80\% of an attached thickness } t_2 \text{ of silica or quartz powder.}$$

4. A mold for producing a silica crucible according to claim 1, wherein an inner surface of the barrier material has a surface roughness of 6.3 to 25 μm as an arithmetic mean roughness Ra.

5. A mold for producing a silica crucible by heat-fusing silica or quartz powder at a state attached onto an inner wall of a rotating mold, the mold comprising:

the inner wall, comprising a bottom surface, intersecting a lower portion of the inner wall, and an upper opening portion of the inner wall intermediate the lower portion and a mold opening, wherein the lower portion of the inner wall defines an inner wall plane of the mold; and a ring-shaped heat insulating barrier disposed on the upper opening portion of the inner wall, which corresponds to an upper region of the silica crucible formed using the mold, said ring-shaped heat insulating barrier having an inner diameter smaller than that of the inner wall plane of the mold and larger than that of the silica crucible formed using the mold, wherein an inner surface of the barrier material protrudes from an inner surface of the mold toward a central axis of the mold to reduce or thin an upper portion of the silica crucible.

6. A mold for producing a silica crucible according to claim 5, wherein the barrier material is quartz, carbon, silicon carbide or silicon nitride.

7. A mold for producing a silica crucible according to claim 5, wherein a protruding thickness $t_1$ of an inner surface of the ring-shaped barrier material from the inner wall of the mold represented by the following equation:

$$t_1 = \text{(mold inner diameter--barrier material inner diameter)}/2 \text{ is 20 to 80\% of an attached thickness } t_2 \text{ of silica or quartz powder.}$$

8. A mold for producing a silica crucible according to claim 5, wherein an inner surface of the barrier material has a surface roughness of 6.3 to 25 μm as an arithmetic mean roughness Ra.

* * * * *

UNITED STATES PATENT AND TRADEMARK OFFICE
CERTIFICATE OF CORRECTION

PATENT NO. : 8,128,055 B2
APPLICATION NO. : 12/604039
DATED : March 6, 2012
INVENTOR(S) : T. Yoshioka et al.

It is certified that error appears in the above-identified patent and that said Letters Patent is hereby corrected as shown below:

In the Claims:

| COLUMN | LINE | ERROR |
|---|---|---|
| 5 (Claim 1, | line 8) | "crucible." should read --crucible,-- |
| 5 (Claim 3, | lines 5-7) | Text shown subscript should be normal sized font: --$t_1$ = (mold inner diameter – barrier material inner diameter)/2 is 20 to 80% of an attached thickness $t_2$ of silica or quartz powder.-- |
| 6 (Claim 7, | lines 5-7) | Text shown subscript should be normal sized font: --$t_1$ = (mold inner diameter – barrier material inner diameter)/2 is 20 to 80% of an attached thickness $t_2$ of silica or quartz powder.-- |

Signed and Sealed this
Third Day of September, 2013

Teresa Stanek Rea
*Acting Director of the United States Patent and Trademark Office*